May 15, 1956  P. E. COLLINS ET AL  2,745,279
PRESSURE TESTING DEVICE AND METHOD
Filed Dec. 12, 1944  2 Sheets-Sheet 1

Inventors:
Paul E. Collins
Guy M. Inman
By: Robert A. Lavender
Attorney.

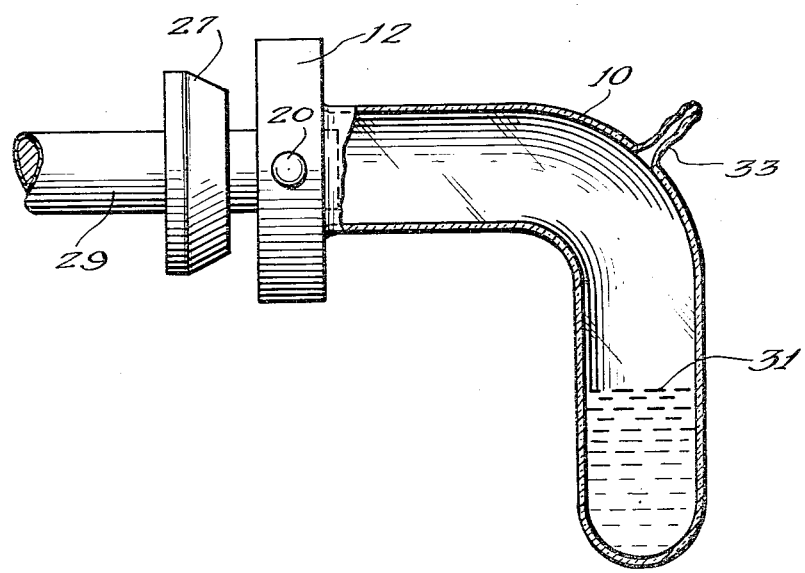

United States Patent Office 2,745,279
Patented May 15, 1956

2,745,279

PRESSURE TESTING DEVICE AND METHOD

Paul E. Collins and Guy M. Inman, Richland, Wash., assignors to the United States of America as represented by the United States Atomic Energy Commission Application December 12, 1944, Serial No. 567,877

10 Claims. (Cl. 73—49.3)

The present invention relates to a method and apparatus for pressure testing of various objects, and is more particularly directed to pressure testing by observation of gas bubbles escaping through a liquid.

While the apparatus and method herein disclosed is applicable to pressure testing of various sealed objects, it is particularly directed to the testing of jacketed uranium slugs or bodies, such as those used in neutronic reactors. Such bodies usually comprise a rod, slug or other uranium article encased in a jacket or sheath of another material, such as aluminum. In some uses of jacketed uranium slugs or bodies, it is essential that the body be absolutely impervious to gases and liquids. Frequently, the bodies are passed successively through a tubular conduit or passage in which they are subjected to bombardment by neutrons for the purpose of producing various products including radioactive fission products, uranium isotopes and other products. The conduits or passages through which the bodies pass generally are only slightly larger in diameter than the bodies, and in order to maintain the surface temperature of the bodies within a desired range during neutronic bombardment thereof, there is passed through the conduit or passage and over the bodies a stream of a suitable coolant, such as, for example, air or water, in order to remove heat developed during the reaction. Uranium is highly reactive with the oxygen and moisture of air and with water, particularly at elevated temperatures, and hence it is desirable that a suitable jacket or covering of a relatively inert or non-corrosive metal be provided upon the uranium body to prevent corrosion thereof by the coolant or the air during passage of the uranium through the reactor.

The provision of protective jackets or coverings upon such corrosive metal bodies presents certain problems of a substantially more complex and difficult nature than merely the protection of the body from contact with reactive coolant fluids. Thus, for example, in the typical use herein described, wherein uranium bodies are subjected to neutron bombardment during passage through a tubular conduit or passage of restricted area, any inleakage of the coolant fluid through the jacket or covering into contact with the uranium body will react therewith to generate gases between the body and the enclosing jacket under pressure sufficient to expand and distort the jacket outwardly, thereby increasing the diameter of the jacketed body to an extent that it becomes wedged or jammed within the conduit or passage and cannot be removed therefrom. When a uranium body that is undergoing neutron bombardment in a neutronic chain reacting system becomes wedged or jammed in this manner, an extremely dangerous condition is presented, and it is absolutely necessary that the possibility of its occurrence be minimized.

It is essential, therefore, that the jacket or covering upon the body be proof against the inleakage of coolants or other fluids that are reactive in respect thereto. It is apparent that each of the slugs or bodies must be carefully tested and that any body that is found to have a porous jacket be discarded or repaired before use.

One of the objects of the present invention is to provide a novel method of pressure testing.

Another object of the invention is to provide simple and relatively simple inexpensive apparatus for pressure testing by reducing the pressure in a liquid surrounding an object to a value below the internal pressure of the object.

Another object is to provide a bubble type pressure testing device in which the receptacle is tiltable to cover the object being tested with liquid prior to reducing the pressure.

Another object is to provide a bubble type pressure testing device in which the object to be tested is supported by the closure for the opening in the receptacle through which the object is inserted in the receptacle.

Further objects of the invention and the various features and details of the construction and arrangement thereof are hereinafter set forth and described with reference to the accompanying drawings, in which:

Fig. 3 is an elevation view, partly in section, of the device of Figs. 1 and 2 shown in another operating position.

Figure 1:
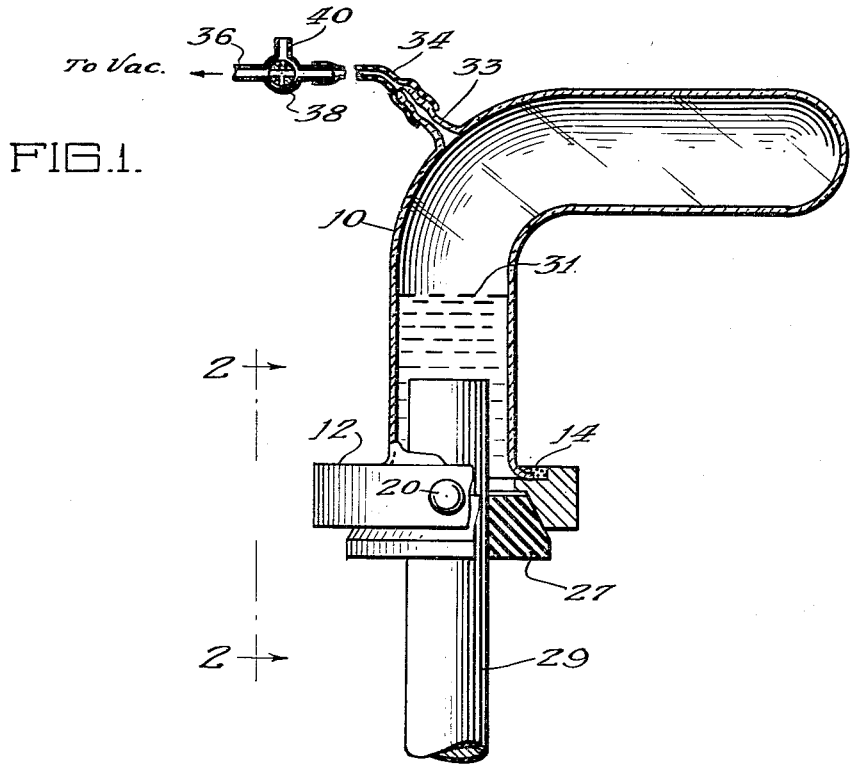
Fig. 1 is an elevation view, partly in section, of apparatus incorporating various features of the invention.
Figure 2:
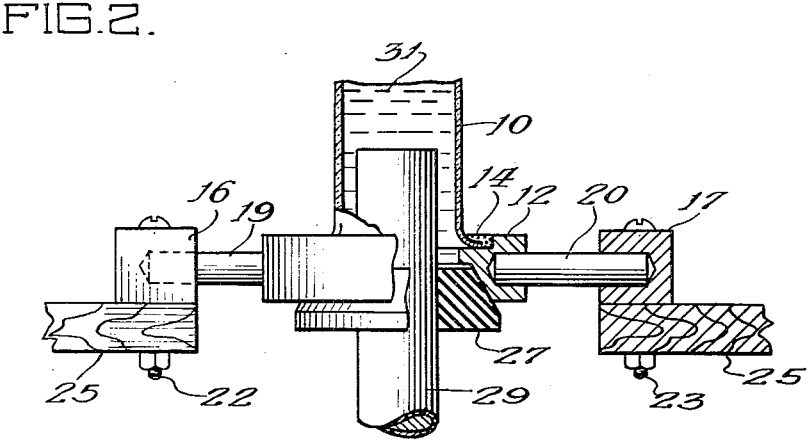
Fig. 2 is an elevation view, partly in section, taken at 2—2 of Fig. 1.

The various figures of the drawings together illustrate a pressure testing device in which a receptacle, sheath, or jacket enclosing a uranium body such as uranium metal or a uranium compound is tested for porosity by inserting it in a receptacle, tilting the receptacle so that liquid covers the portion of the slug within the receptacle, and evacuating the receptacle so that gas retained within the jacket of the slug will escape through any porous part of the jacket and appear as bubbles in the liquid.

Generally, uranium slugs or bodies of the type referred to hereinafter comprise a cylindrical uranium slug that is inserted in a closely fitting drawn aluminum can. An aluminum disk is placed on top of the uranium slug, the upper edges of the can rolled over, and the inner edges of the rolled portion of the can welded to the disk. It is this weld which constitutes the portion of the jacket most likely to leak. After the welding operation, the small volume of gas entrapped within the slug will rapidly approach atmospheric pressure if any porosity exists.

Referring to the drawings, an L-shaped glass receptacle 10, of circular cross section, is hermetically sealed to a ring 12 by a suitable sealing compound 14. The ring is pivoted in blocks 16 and 17 on trunnions 19 and 20 respectively, the blocks 16 and 17 being secured by bolts 22 and 23 to a supporting member 25. The trunnions 19 and 20 have a force fit in the ring 12 but are free to rotate in the blocks 16 and 17.

The ring 12 is shaped internally to provide a conical seat for an elastic gas tight closure or seal 27 of rubber or synthetic rubber. Polymerized chloroprene (2 chloro butadiene 1,3) is found to be especially suitable. The seal 27 is provided with a cylindrical opening therethrough through which an aluminum jacketed uranium bar or slug 29 extends. In order to test the welded end of the slug 29 for porosity, the slug 29 or other sealed article is inserted through the opening in the seal 27 far enough so that the inserted end may be conveniently observed through the glass wall of the receptacle 10 before the slug 29 and the seal 27 are applied to the ring 12.

It will be apparent that in operative position, the seal 27 serves as a support for the slug 29 that is to be tested. Likewise, when somewhat smaller objects are to be tested, the object could be rested on the inner portion of the seal 27 and the opening through the seal 27 could then be eliminated.

A quantity of liquid 31, preferably of a relatively non-volatile fluid nature such as kerosene, glycol or the like, is contained within the receptacle 10.

A vacuum connection 33 is provided in the receptacle 10 at a point on the surface of the receptacle 10 which will never come in contact with the liquid 31 during evacuation of the device. A flexible tube 34 serves to connect the receptacle 10 to a source of vacuum 36 through a three-way valve 38. In the position of the three-way valve shown in Fig. 1, the source of vacuum 36 and the interior of the receptacle 10 are interconnected. Rotation of the valve 38 by 90° in a counterclockwise direction will connect the receptacle 10 to an atmospheric connection 40 to break the vacuum within the receptacle 10.

The method of operation is as follows. The receptacle 10 and the ring 12 are initially in the position shown in Fig. 3 with the liquid 31 in the end of the receptacle 10 remote from the ring 12. The slug 29 or other article to be tested is inserted in the seal 27 and the article so mounted is inserted in the receptacle until the seal 27 engages the interior conical surface of the ring 12. The three-way valve 38 is in a position to place the connection 33 in communication with the atmosphere.

When the seal 27 engages the ring 12, it is desirable to reduce the pressure slightly within the receptacle 10 before tilting the receptacle in order to create a good seal between the ring 12 and the seal 27. The receptacle 10 and the ring 12 are now rotated counterclockwise approximately 90° from the position shown in Fig. 3 to the position shown in Fig. 1. The liquid 31 flows from the end of the receptacle 10 remote from the ring 12 to the end of the receptacle 10 adjacent the ring 12 to cover the slug 29.

The three-way valve 38 is then operated to connect the receptacle 10 to a vacuum source which establishes a relatively high vacuum within the receptacle 10. As pointed out hereinbefore, gas entrapped within the jacket of the slug 29 is initially at atmospheric pressure particularly if there is any porosity in the jacket of the slug 29. Reduction of the pressure on the liquid 31 surrounding the slug 29 results in gas being forced through any openings in the jacket. Since the gas passes into the liquid 31, bubbles will be formed that are readily visible through the glass receptacle 10.

After the slug 29 has been tested as described above, the receptacle is rotated to the position shown in Fig. 3 to return the liquid 31 to the remote end of the receptacle 10. The three-way valve 38 is operated to break the vacuum within the receptacle 10 and the slug 29 together with the seal 27 is withdrawn from the ring 12.

The receptacle 10, as illustrated, is L shaped for convenience of operation. This shape permits the liquid 31 to be moved from one end of the receptacle 10 to the other with a rotative displacement of approximately 90°. Other shapes of the receptacle 10 are equally within the contemplation of the invention. It will be evident, for instance, that the receptacle 10 would operate successfully if it were a substantially straight cylinder.

It will be apparent that the apparatus described could be employed equally well in testing any object that contains any gas beneath its surface. For instance, the apparatus can be used to test the seal of carbonated beverage bottles by providing a suitably shaped seal 27.

The process may be conducted using other convenient means for establishing a differential pressure between the interior and exterior of the sealed article. For example, the sealed object may be subjected to high gas pressure immediately before treatment in the above test.

Alternatively the sealed object may be gently heated below the boiling point of the liquid in which it is immersed to cause expansion of the gas therein and consequent formation of bubbles at defective points in the receptacle.

While one embodiment of the invention has been illustrated and described, variations thereof will be apparent to those skilled in the art, and the scope of the invention is, therefore, to be determined only by the appended claims.

We claim:

1. In a device for testing porosity of a sealed container, in combination: a transparent receptacle adapted to contain a liquid and having an opening therein; means for removably sealing and supporting at least a portion of said container within said receptacle; tiltable mounting means attached to the receptacle whereby the receptacle may be tilted to a position in which the liquid covers at least the portion of said container sealed within the receptacle; and means for changing the pressure within said receptacle.

2. In a device for testing porosity, in combination, a receptacle having a transparent portion and having an opening therein, said receptacle being shaped to contain a liquid in a portion remote from the opening, means for removably sealing an end of an object to be tested in the opening in said receptacle, said sealing means serving as a support for the object to be tested, means for changing the fluid pressure within said receptacle, and tiltable mounting means whereby said receptacle may be tilted to a position in which the liquid covers the object to be tested.

3. In a device for testing porosity of a container sealed at an end, in combination, a transparent receptacle removably sealable to said container with said end within said receptacle, said receptacle being shaped to contain a liquid remote from said sealed end in a first position and covering said sealed end in a second position, a pivotal support for said receptacle about which said receptacle may be moved between said first and second positions, and means for changing the pressure within said receptacle.

4. In a device for testing porosity, in combination, a receptacle having a transparent portion and having an opening therein, said receptacle being shaped to contain a liquid in a portion remote from the opening, means for removably sealing an end of an object to be tested in the opening in said receptacle, said sealing means serving as a support for the object to be tested, and a pivotal support for said receptacle about which said receptacle may be rotated to a position in which the liquid covers the object to be tested.

5. In a device for testing porosity, in combination, a receptacle having a transparent portion and having an opening therein, said receptacle being shaped to contain a liquid in a portion remote from the opening, means for removably sealing an end of an object to be tested in the opening in said receptacle, said sealing means serving as a support for the object to be tested, a pivotal support for said receptacle about which said receptacle may be rotated to a position in which the liquid covers the object to be tested, and means for changing the pressure within said receptacle.

6. In a device for testing porosity, in combination, a receptacle having an opening and having a transparent portion, a trunnioned ring secured to said receptacle, removable closure means for closing the opening, said closure means serving as a support for an object to be tested, a quantity of liquid within said container adapted to cover the object to be tested, a pivotal mounting for the trunnioned ring, and means for reducing the pressure within said receptacle whereby gas escaping from the object to be tested will appear as bubbles in said liquid.

7. In a device for testing porosity, in combination, a transparent receptacle, a trunnioned ring secured to an opening in said receptacle, said receptacle being adapted to contain a quantity of liquid remote from the opening and said ring when said receptacle is in a first position, removable closure means for closing the opening in said ring, said closure means serving as a support for an object to be tested, said receptacle being rotatable about the trunnions of said ring to a second position in which the quantity of liquid contained therein covers the object to be tested, and means for reducing the pressure within said receptacle, whereby gas escaping from the object to be tested will appear as bubbles in the liquid.

8. The method of testing an object for porosity which comprises inserting the object through an opening in a receptacle that contains a liquid in a portion thereof lower than the opening, tilting the receptacle so that the liquid covers the portion of the object that is to tested, and establishing a differential pressure between the interior of the receptacle and the interior of the object in order that gas escaping from the object will appear as bubbles in the liquid.

9. The method of testing an object for porosity which comprises inserting the object in a receptacle that contains a liquid in a portion thereof remote from the object, sealing said receptacle, tilting the receptacle so that the liquid covers the portion of the object that is to be tested, and reducing the pressure within the receptacle in order that gas escaping from the object will appear as bubbles in the liquid.

10. The method of testing an object for porosity which comprises inserting the object in a receptacle that contains a liquid in a portion thereof remote from the object, sealing said receptacle, tilting the receptacle so that the liquid covers the portion of the object that is to be tested, reducing the pressure within the receptacle in order that gas escaping from the object will appear as bubbles in the liquid, and returning the receptacle to a position in which the liquid no longer covers any portion of the object tested so that the receptacle may be unsealed without loss of liquid.

References Cited in the file of this patent

UNITED STATES PATENTS

| | | |
|---|---|---|
| 1,547,126 | Maede | July 21, 1925 |
| 1,973,754 | Geyer | Sept. 18, 1934 |
| 2,108,176 | Newby | Feb. 15, 1938 |
| 2,182,564 | Leiboff | Dec. 5, 1939 |
| 2,261,235 | Doelling | Nov. 4, 1941 |

FOREIGN PATENTS

| | | |
|---|---|---|
| 445,684 | Great Britain | Apr. 16, 1936 |
| 209,379 | Switzerland | June 17, 1940 |
| 537,588 | Great Britain | June 27, 1941 |